United States Patent
Feyerabend et al.

(10) Patent No.: US 12,488,305 B2
(45) Date of Patent: Dec. 2, 2025

(54) CARGO MONITORING METHOD

(71) Applicant: ZF CV SYSTEMS GLOBAL GMBH, Bern (CH)

(72) Inventors: Konrad Feyerabend, Hannover (DE); Sebastian Kuehne, Sarstedt (DE); Gafur Zymeri, Ronnenberg (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 0 days.

(21) Appl. No.: 18/690,277

(22) PCT Filed: Sep. 7, 2022

(86) PCT No.: PCT/EP2022/074783
§ 371 (c)(1),
(2) Date: Mar. 8, 2024

(87) PCT Pub. No.: WO2023/036793
PCT Pub. Date: Mar. 16, 2023

(65) Prior Publication Data
US 2024/0403806 A1    Dec. 5, 2024

(30) Foreign Application Priority Data
Sep. 13, 2021    (DE) ............ 10 2021 123 581.2

(51) Int. Cl.
*G06Q 10/0832* (2023.01)
*G01S 7/48* (2006.01)
(Continued)

(52) U.S. Cl.
CPC ........ *G06Q 10/0832* (2013.01); *G01S 7/4808* (2013.01); *G01S 17/42* (2013.01);
(Continued)

(58) Field of Classification Search
CPC ... G06Q 10/0832; G01S 7/4808; G01S 17/42; G01S 17/89; G06T 2207/10028;
(Continued)

(56) References Cited

U.S. PATENT DOCUMENTS

| 10,163,219 B2 | 12/2018 | Carlson et al. |
| 2014/0267611 A1* | 9/2014 | Kennett ............ G06V 40/23 |
| | | 348/46 |

(Continued)

FOREIGN PATENT DOCUMENTS

| DE | 102014226108 A1 | 6/2016 |
| DE | 102017212596 A1 | 1/2019 |
| EP | 3232404 B1 | 5/2021 |

OTHER PUBLICATIONS

Wikipedia (Wikipedia. Time-of-flight camera. Wikipedia, The Free Encyclopedia. May 27, 2022, 22:35 UTC) (Year: 2022).*

(Continued)

*Primary Examiner* — Lisa M Caputo
*Assistant Examiner* — Christian T Bryant
(74) *Attorney, Agent, or Firm* — LEYDIG, VOIT & MAYER, LTD.

(57) ABSTRACT

A method for detecting moving bodies or cargo parts inside a cargo space, including storing 3D data describing each measuring point of any bodies or cargo parts in the cargo space as a first data set and carrying out a further, subsequent three-dimensional measurement and storing the 3D data describing the corresponding measuring points of the bodies or cargo parts in the cargo space as further data sets. A third or fourth step is performed. The third step includes comparing 3D data of individual, spatially corresponding measuring points of the first and the further measurement(s) with each and, if changes in the 3D data are detected, carrying out the fourth step and further steps. The fourth step includes checking the first and the further data set(s) by an algorithm (Continued)

to determine whether subsets of the 3D data contained therein characterize a three-dimensional body or a cargo part.

20 Claims, 7 Drawing Sheets

(51) Int. Cl.
  *G01S 17/42* (2006.01)
  *G01S 17/89* (2020.01)
  *G06T 7/70* (2017.01)
  *G06T 7/80* (2017.01)

(52) U.S. Cl.
  CPC .............. *G01S 17/89* (2013.01); *G06T 7/70* (2017.01); *G06T 7/80* (2017.01); *G06T 2207/10028* (2013.01); *G06T 2207/30248* (2013.01)

(58) Field of Classification Search
  CPC .... G06T 7/70; G06T 7/80; G06T 7/20; G06T 2207/30248
  See application file for complete search history.

(56) References Cited

U.S. PATENT DOCUMENTS

| | | | |
|---|---|---|---|
| 2017/0372484 A1* | 12/2017 | Carlson | G06F 18/40 |
| 2019/0065888 A1* | 2/2019 | Calenzo | G06F 18/22 |
| 2021/0173045 A1* | 6/2021 | Hu | G01S 7/415 |
| 2022/0300001 A1* | 9/2022 | Gayaka | G10L 15/08 |

OTHER PUBLICATIONS

Griffin et al. ("Depth from Camera Motion and Object Detection," 2021 IEEE/CVF Conference on Computer Vision and Pattern Recognition (CVPR), Nashville, TN, USA, 2021, pp. 1397-1406, doi: 10.1109/CVPR46437.2021.00145.) (Year: 2021).*

* cited by examiner

CARGO MONITORING METHOD

CROSS REFERENCE TO RELATED APPLICATIONS

This application is a U.S. National Phase application under 35 U.S.C. § 371 of International Application No. PCT/EP2022/074783, filed on Sep. 7, 2022, and claims benefit to German Patent Application No. DE 10 2021 123 581.2, filed on Sep. 13, 2021. The International Application was published in German on Mar. 16, 2023 as WO 2023/036793 A1 under PCT Article 21(2).

FIELD

The invention relates to a method for detecting moving bodies or cargo parts inside a cargo space.

BACKGROUND

The monitoring of cargo spaces by means of monitoring systems, especially electronic systems, is becoming increasingly important given today's traffic flows and the requirements on the logistics of goods. In this respect, the cargo spaces of trucks and containers in particular are the focus of fleet operators, freight forwarders and mail order companies and must be used as efficiently as possible and operated at a high level of safety.

On the one hand, loading and unloading operations must be taken into account, which can be done by measuring, scanning or otherwise identifying the bodies or cargo parts that are loaded into a cargo space before or during loading.

On the other hand, with today's large-volume cargo spaces, it is essential to monitor the cargo for possible movements or changes in position, especially for changes in position caused by transport operations, i.e. while travelling. This can be done by regularly checking by the driver while travelling, but also by means of aids, such as lashing straps with tensile force measuring devices, or automated methods of detecting changes in the position of cargo parts.

With regard to the first-mentioned detection of cargo parts as such, methods are known in the prior art with which, for example, cameras are mounted on forklifts that scan the individual cargo items during loading and add up the results to a total cargo or to a degree of filling within the cargo space. Other solutions work with RFID tags/labels (RFID Radio Frequency Identification) attached to cargo parts, which are detected during loading or within the cargo space by corresponding antennas in the cargo space or, for example, in the loading area at the ramp. As a result, an exact determination of a spatially determined cargo condition within the cargo space is only possible to a limited extent.

In this respect, the prior art also shows methods with which individual cargo parts can be spatially determined with the help of computer-aided measurements and identified according to size or dimension. For example, EP 3 232 404 A1 discloses a method and a system for measuring the dimensions of a target object or a cargo part on a pallet or on a carrier, wherein a 3D data set is determined with the help of a sensor or a depth-sensitive camera, which describes the three-dimensional, physical space occupied by the target object with the help of depth data, i.e. distance data (distance from the sensor).

Computer-aided methods are also known in the prior art for monitoring the cargo for possible movements or changes in position, i.e. with regard to the detection of moving bodies or cargo parts inside a cargo space, which is important for safety reasons.

U.S. Pat. No. 10,163,219 B2 discloses a method for displaying a changed cargo position, wherein the position of a cargo part can be detected at an initial point in time with the help of a camera and image processing software, for example by edge detection. The detected position is then displayed to the driver on a screen. The driver must then manually confirm the detection of the cargo part and the position thereof, for example by tapping the displayed position on the screen (prompting). With the help of periodic further runs of the condition detection by the camera and image processing software, it is then determined whether the position of the cargo part has changed and then, if appropriate, a signal is generated. In this case, a semi-automatic method can only be used to detect that a change has taken place. However, it is not possible to dynamically observe and interpret the nature of the movement.

US 2019/0065888 A1 discloses the monitoring of a cargo space with the help of a depth sensitive TOF camera (TOF: time offlight), which is first used to measure the depth of a cargo space, then of the same cargo space with additional or removed cargo parts, after which the two images are compared and loaded or unloaded items are determined. A more detailed and reproducible description of the comparison method is not disclosed. The measurement is always related to a photograph of the entire cargo space scene, or to the total volume. No statement is made about the detailed behavior of a single cargo part.

The methods known in the prior art for monitoring movements or changes in the position of cargo parts are therefore only able to detect deviations in the position of a previously determined or manually identified cargo part and can usually only determine whether a movement or change in position has taken place, but not the shape of the dynamic course of this movement. This means that with the methods known in the prior art, it is possible to detect that a movement/change has taken place, but that no valid statement can be made about what kind of movement or change of position is present, i.e. whether, for example, there is only a swaying or wobbling of cargo parts or a complete tilting or shifting/slipping of the cargo is taking place or has taken place. The detection is thus reduced to the essentially binary statement of whether a movement has taken place or not.

Of course, in the prior art there are a number of commonly used sensors and methods for detecting movements in a wide variety of application fields, for example in the industrial sector, in domestic applications or in security equipment. Essentially, a distinction is made between active and passive motion sensors. Active sensors have a transmitter and a receiver and usually measure changes within the path of an emitted energy beam. Passive sensors react to changes in radiation in the observed environment, such as changes in infrared radiation from people or objects. The application of such systems requires a relatively complex setup and must be adapted to the objects or bodies to be monitored. In the case of different objects to be monitored, multiple sensors with different measuring principles can be required in order to give a reliable indication. The use of such motion detection systems, which are common in other areas, has not only not been established within cargo spaces for these reasons, but is also not the first choice from an economic point of view.

SUMMARY

In an embodiment, the present disclosure provides a method for detecting moving bodies or cargo parts inside a cargo space, wherein the cargo space is measured three-dimensionally with at least one distance-measuring, depth-sensitive sensor and the current distances of measuring points or measuring point sets of any bodies or cargo parts in the cargo space are detected by the sensor as measured values in the form of 3D data. The method comprises, in a first step, in a first measurement, storing the 3D data describing each measuring point of any bodies or cargo parts in the cargo space as a first data set in a computation and/or evaluation unit. The method comprises, in a second step, carrying out at least one further, subsequent three-dimensional measurement and storing the 3D data describing the corresponding measuring points of the bodies or cargo parts in the cargo space in the computation and/or evaluation unit as further data sets and performing either a third step, or without prior performance of the third step, a fourth step. The third step includes comparing 3D data of the individual, spatially corresponding measuring points of the first and the further measurement or measurements with each other by an algorithm programmed in the computation and/or evaluation unit and, in the event that changes in the 3D data are detected from spatially corresponding measuring points of the first and the further data sets, the fourth step and the following further steps are carried out. The fourth step includes checking the first and the further data set(s) by an algorithm programmed in the computation and/or evaluation unit to determine whether subsets of the 3D data contained therein characterize a three-dimensional body or a cargo part and storing and indexing the first and the further data set(s) as a 3D data cluster characterizing the three-dimensional body or cargo part. The method includes, in a fifth step, comparing the 3D data clusters of the first and further data sets, which characterize three-dimensional bodies or cargo parts determined from spatially corresponding measuring points or measuring point sets, with each other by the algorithm in the computation and/or evaluation unit. In the event that the comparison of the 3D data clusters for spatially corresponding three-dimensional bodies or cargo parts of the first and further data set(s) of the first and further data sets reveals changes in the 3D data clusters that characterize spatial changes of the spatially corresponding three-dimensional bodies or cargo parts within a time interval, a signal that describes these changes and that can be further processed is provided by the computation and/or evaluation unit.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides an improved method for monitoring cargo parts within cargo spaces, which not only allows the position of bodies or cargo parts in the cargo space as such to be measured and possible movements thereof to be determined, but also enables a dynamic analysis of the nature of the movement and qualitative determination of the location of the bodies or cargo parts and the change of location within the cargo space. Furthermore, the object is to provide a method that can be applied without excessive intervention in other surrounding systems, which provides sufficiently reliable results for the determination and monitoring of a cargo space and which can be used for arbitrarily designed cargo spaces.

Also disclosed is a device for carrying out the method and a vehicle with a cargo space equipped with the device.

Here the cargo space is measured three-dimensionally with at least one distance-measuring, depth-sensitive sensor, wherein in a first step, the 3D data describing each measuring point of any bodies or cargo parts in the cargo space are stored as a first data set, a so-called 3D point cloud, in a computation and/or evaluation unit and optionally provided with a time stamp. Such a timestamp is not absolutely necessary, as it is also possible to work with indexes/serial numbers, with which each data set is provided, with sequential filing/storage or with fixed time intervals of the measurement to represent the sequence of measurements.

In a second step, at least one further, subsequent three-dimensional measurement is carried out, wherein the 3D data describing the corresponding measuring points of the bodies or cargo parts in the cargo space are stored in the computation and/or evaluation unit as further data sets and optionally also provided with a time stamp.

Thereafter, either in a third step the 3D data of the individual, spatially corresponding measuring points of the first and subsequent measurements or measurements by means of an algorithm programmed in the computation and/or evaluation unit are compared with each other, wherein in the event that changes in the 3D data are detected from spatially corresponding measuring points of the first and the further data sets, as described below a fourth and further steps of the method are carried out, or the fourth step described below is carried out without first taking the third step.

An advantageous design of the third step is that in the third step the 3D data of the first measurement and the further measurement or measurements are compared with each other and, in the event that a number of changes in the 3D data exceeding a predetermined threshold value are detected, the steps of the method described below are carried out. It makes sense to take such a threshold value into account, for example, in order to filter out random or unstable measurement data.

In the fourth step, the first and further data sets (3D point clouds) are checked by means of an algorithm to determine whether subsets of the 3D data contained therein describe or characterize a three-dimensional body or a cargo part, wherein if applicable these 3D data are stored, indexed and optionally provided with a time stamp as a 3D data cluster (subset) characterizing a three-dimensional body or cargo part (volume).

This is followed by a fifth step, in which the 3D data clusters of the first and further data sets, which characterize three-dimensional bodies or cargo parts determined from spatially corresponding measuring points or measuring point sets, are compared with each other by means of the algorithm in the computation and/or evaluation unit. In the event that the comparison of the 3D data clusters for spatially corresponding three-dimensional bodies or cargo parts of the first and further data sets determines changes in the 3D data clusters that characterize spatial changes of the spatially corresponding three-dimensional bodies or cargo parts within a time interval, the computation and/or evaluation unit will provide a signal that describes these changes and which can be further processed.

The term "spatially corresponding measuring points or measuring point sets" describes the measuring points within the boundaries of a space to be measured, which are assumed to be at the same spatial position or describe or occupy the same spatial position as in the previous measurement, i.e. basically characterize the same location in the three-dimensional coordinate system. In order to determine changes in the spatially corresponding measuring points, it can be done, for example, in such a way that the algorithm superimposes a three-dimensional expectation space or expectation range around the exact original determined value, in which a deviation can move and still be regarded as a spatially corresponding but "changed" measurement point despite an absolute deviation in at least one dimension.

Spatially corresponding three-dimensional bodies or cargo parts are to be understood as volumes of any kind described by 3D data clusters and contain a rectangular box as well as an arbitrarily shaped body.

The comparison of the 3D data of the data sets carried out in the third step according to the method can also be carried out in such a way that the directly preceding 3D data set is not compared with the subsequent data set, but that a previous data set that is more distant is used. This may be necessary if irregularities have occurred within a measurement cycle that suggest that the quality of the preceding data collection is inadequate.

An advantageous development is that already during the first and second steps of the three-dimensional measurement of the bodies or cargo parts in the cargo space, the parameters thereof are stored and indexed as a 3D data cluster, especially with regard to the position and width, height and depth thereof. Within the framework of such an advantageous procedure, a certain variation in the sequence of the processing steps is possible, wherein for example, it is also possible to carry out the fourth step of the method independently of the third step of the method, as described above. A variation essentially contains a summary or combination of steps of the method and in this sense does not depart from the original framework of the method according to an embodiment of the invention, i.e. does not constitute a different thing.

Coming back to the first step, the interior of the cargo space is measured three-dimensionally with a distance-measuring, depth-sensitive sensor. For this purpose, the 3D data describing each measuring point of any bodies or cargo parts in the cargo space are stored as a first data set (3D point cloud) and optionally provided with a time stamp. In the second step, at least one further, subsequent, corresponding three-dimensional measurement is carried out with the help of the sensor, wherein the 3D data describing the corresponding measuring points is also stored as an associated second or further data set and optionally also provided with a time stamp. The at least one further three-dimensional measurement is to be understood here as "any further" measurement in the sense of each repeating subsequent measurement (second or further data set) of a preceding measurement (first data set).

The 3D data also represent so-called depth data, namely the "depths" or rather the distances of the corresponding measuring points from the sensor. In this way, it is possible to see the distances of each detected surface of an object and thus the position thereof. A repetition of the measurement makes it possible to determine the change in these data.

Based on the consideration that due to the measurement with the help of a depth-sensitive sensor not only is the distance of each measuring point belonging to a body or cargo part from the sensor known, but thus also the distances of individual measuring points from each other, and based on the assumption that a small spatial change of a measuring point also produces a change, albeit a minimal one, in the corresponding 3D data when comparing two consecutive data sets, the idea underlying the method according to an embodiment of the invention is that a "single" change, which is initially easily detectable, triggers further more comprehensive processing steps or steps of the method when individual changes become conspicuous. Such "individual" changes are detected very quickly and precisely either in the third or fourth step of the method.

The change of individual 3D data items is thus assigned a kind of indicator function for any more serious changes to be expected. This is particularly successful if a change in individual, particularly conspicuous and prominent 3D data items is recognizable, for example those that belong to boundary or corner areas of a cargo part.

If such changes occur, further processing steps are then used to check whether the individual 3D data item or the number of altered 3D data items belongs to 3D data that describe a cargo part or a body (a volume). With the help of indexing, optionally also taking into account a time stamp, it is also determined whether, in what direction and at what speed the cargo part or the body (the volume) to which this individual 3D data item or the number of altered 3D data items belong(s) has moved.

The method according to an embodiment of the invention leads to a very fast and reliable detection of changes in the cargo parts or volumes, wherein in an advantageous development the depth, height and width of the moving cargo parts or volumes are also determined and stored as a 3D data cluster, i.e. as a subset of the respective data set. Such a method of three-dimensional evaluation allows the old and the new position of the cargo part to be clearly recognized, as well as the direction of movement and the type of movement.

The measurements with the distance-measuring, depth-sensitive sensor can be carried out periodically, which is advantageous in terms of continuous condition determination, but they can also be carried out at irregular intervals or as required.

Another advantageous development is that in the third step, the 3D data are detected in such a way that, on the one hand, 2D data of a 2D image captured by a sensor or camera are determined and, on the other hand, distance information/distance is determined for each pixel of the 2D image. In the third step, only the 2D data of the individual, spatially corresponding measuring points of the first and the subsequent measurement or measurements are compared with each other by means of an algorithm programmed in the computation and/or evaluation unit and, in the case that changes in the 2D data are detected from spatially corresponding measuring points of the first and the further data sets, in particular in the case in which a number of changes exceeding a predefined threshold value are detected, the further steps of the method are carried out with the inclusion of the distance information or the 3D data for each measuring point.

Such an evaluation, which is initially reduced to only 2D data, represents a simplified initial check to be carried out accordingly with simplified software, with which it can be determined whether changes in the 2D data are already present in a two-dimensional view. If the answer is yes, the further steps of the method are then carried out again using the 3D data.

In the third step with this design, the pixels of a two-dimensional representation of the individual, spatially corresponding measuring points of the first and the further measurement or measurements are compared with each other by means of an algorithm programmed in the computation and/or evaluation unit and, in the event that a number exceeding a predetermined threshold value of changes in the pixels from spatially corresponding measuring points of the first and the further data sets or one of the further data sets is detected, the further steps are carried out.

This also reduces the data set to be processed for the first step of the detection according to the method according to an embodiment of the invention in such a way that only pixels, i.e. image points of a two-dimensional representation of the measured values, are compared with each other. Here, too, an indicator function is specified, which triggers the further steps of the method for the precise determination of the movement.

Another advantageous design involves checking the change in the 3D data compared to the previous measurements for a change in the positioning of a body or cargo part with the same or changing signs in the spatial x, y, or z direction. In particular, in combination with another advantageous design, in which the change in the 3D data compared to the previous measurements is checked for a spatial change in a 3D data cluster characterizing an indexed three-dimensional body or cargo part, there is a highly dynamic and rich possibility of the interpretation of the obtained data.

With such a directional determination and identification by detecting the cluster indexing, the method according to an embodiment of the invention is able to determine whether a swaying or wobbling of cargo parts is noticeable and whether, in a further comparison of the associated indexed data clusters, this wobbling has led to a cargo part completely changing its position, for example falling from a stack. The method according to an embodiment of the invention is thus capable of detecting not only a swaying or wobbling of the cargo, but also a subsequent change in the position of a body or cargo part, such as falling or sliding within the cargo space. All of this is possible almost in real time thanks to the method according to an embodiment of the invention.

This makes it possible to determine very precisely and in real time whether a previously identified cargo part or body has moved, i.e. has slipped. In addition, even very small movements of the cargo can be detected, so that an indication can quickly be given regarding the safety status of the cargo. If a cargo part falls from a stack when the cargo is stacked high, the method according to an embodiment of the invention can also be used to determine the height from which the cargo part has fallen and the position in which it is located after the fall.

The processable signal can be used to generate warnings for the driver, to generate signals for a control unit carrying out further processing, or to generate therefrom data for a visual representation of the cargo space, the location of the bodies or cargo parts in the cargo space and the current cargo status, in particular for display on a monitor or display device, in particular as a three-dimensional cargo image.

The provided further processed signal can also contain all the parameters calculated from the 3D data, such as those that describe the respective position and dimensions of bodies or cargo parts.

The 3D data can be used as a basis for further model calculations or for the generation of video data, which can then be displayed on a monitor and result in a three-dimensional image that represents the current cargo status. The data or data processing can be sent via communication equipment, for example to the headquarters of a freight forwarding company or to authorities whose task it is to check the cargo.

In order to create a direct relation to an observed cargo space, the algorithm can be designed in such a way that the 3D data of the boundary surfaces of the cargo space, i.e. floor, side walls and ceiling, are also stored in identifiable 3D data clusters and are thus known and "set" for all further measurements. This information is then used to easily distinguish between 3D data that describe the cargo space as such, and 3D data that describe the cargo parts or bodies.

In an advantageous way, the zero point of the coordinate system is placed in a corner of the cargo space opposite the sensor. For this purpose, the sensor is advantageously positioned on a wall or boundary of a cargo space and directed towards the opposite wall in such a way that the measuring range of the sensor covers the entire cargo space, wherein the zero point of the three-dimensional measurements is calibrated into a corner of the cargo space. Any other point can also be used as the zero point of the coordinate system. In such a sensor arrangement, the entire cargo space up to the front wall is then located in the measuring range.

According to the method according to an embodiment of the invention, it can also be determined whether a body or part of cargo has been added to the cargo space, has been removed or has been moved from its original place to another place in the cargo space. All that is required is to compare the 3D data sets and 3D data clusters of a 3D data set determined before the event (add body or cargo part) with a data set that includes 3D data measured after the event. New bodies or cargo parts that have been added within the cargo space then receive their corresponding 3D data clusters, which can be identified during further measurements.

Another advantageous design is that the sensor is designed as an optical depth sensor, especially as a time of flight camera (TOF camera) or stereo camera. A TOF camera, for example, provides the distance of the body depicted on it for each image point. An entire scene can be recorded at once without the need for individual scanning. This, of course, leads to faster processing of the corresponding signals. Depending on the application, it is also advantageous if the sensor is designed as a LiDAR (light imaging, detection and ranging) sensor or laser scanner (light amplification by stimulated emission of radiation), which is a cheaper alternative for rasterized scanning. These systems as such are well known.

Another advantageous design involves checking the confidence in and completeness of the modified 3D data of the second data set, and/or setting a threshold value for noise in the measurement.

This can be done, for example, by evaluating the profile of the change against time of the measured values that characterize the distances of measuring points or measuring point sets. The temporal history can be used to determine, based on limit values or incidents/occurrences, whether, for example, an expected measured value, i.e. the occurrence of a measurement point described by 3D data in a certain expected range, i.e. at a certain distance, occurs only after a time threshold value has been exceeded or only occurs for a short period of time and then disappears again, i.e. does not remain stable.

By the described three-dimensional measurement, the currently determined state and the previous state determined during the previous measurement are known, and thus also the parameters of the corresponding bodies or cargo parts, namely the depth (distance from the sensor), the width, the height, the position and the volume thereof.

By comparing the currently determined 3D data of a 3D data cluster with the existing 3D data cluster information and performing additional checks to determine whether the 3D data have a minimum quality or stability, or whether it does not appear sufficiently often in an expected range, it can also be determined whether the sensor was not able to measure certain areas. At the same time, it can be used to analyze the 3D data of the environment of the respective measuring points and compare them with the preceding data.

Another advantageous design is that a visual representation of the cargo space, the location of the bodies or cargo parts in the cargo space and the current cargo condition are displayed on a monitor in the form of a three-dimensional cargo image. A corresponding computational processing of the 3D data then provides easily interpreted images on a monitor, which allow a very fast and intuitive assessment by a person checking the cargo.

Another advantageous design consists of carrying out the periodic measurement of the 3D data of each measuring point at a frequency of 1 Hz to 5 Hz. Such periodic checking is sufficiently dynamic to achieve sufficient accuracy for the monitoring of a truck cargo space and a defined determination of movements of a cargo part when applying the method according to an embodiment of the invention.

It makes sense to use the 3D data that describe the parameters, i.e. the width, height and depth of each individual body or cargo part in the cargo space, to determine the area requirement and/or the volumes of the bodies or cargo parts and to set them in relation to the available cargo space area or the available volume of the cargo space. Then, for example, the sum of all calculated volumes of all bodies and/or cargo parts can be used to calculate the occupied total volume and thus also determine the remaining free volume in the cargo space. The same applies to the calculation of the total areas occupied by all bodies and/or parts of the cargo in relation to the still free, unoccupied area. The relevance of such determinations to the cargo planning of for example fleet operators or freight forwarders can be seen immediately.

Another advantageous design involves making the further processable signal available for storage in data processing systems, in particular for use in control equipment and for use and processing within a data communication system. For example, these signals can also be sent to the headquarters of a freight forwarder or a fleet operator via any other radio equipment that can be connected to the vehicle belonging to the cargo space.

In addition, a device is disclosed that is suitable for monitoring a cargo space and for carrying out the method according to an embodiment of the invention. The device has at least one distance-measuring, depth-sensitive sensor for repeated three-dimensional measurement of the cargo space, as well as a computation and/or evaluation unit with a programmed algorithm. By means of the computation and/or evaluation unit and the algorithm provided in this way, the 3D data of each measuring point of any bodies or cargo parts in the cargo space are determined by repeated measurement, stored as data sets (3D point clouds) and compared with each other according to the method according to an embodiment of the invention. When changes are detected, a processable signal is provided. The advantage of this lies in the usability/provision of such a device for any cargo space, for example for the cargo spaces of trucks, but also for cargo containers of ships or other vehicles.

The method according to an embodiment of the invention and the device particularly suitable for this purpose are particularly suitable for a vehicle with a cargo space, for example for a truck or a wagon train. It can also be used for containers that are transported in different vehicles. Here the vehicle or container in question has a cargo space that is equipped with at least one distance-measuring depth-sensitive sensor for three-dimensional measurement provided inside the cargo space, wherein the vehicle also has a computation and/or evaluation unit with a programmed algorithm with which the 3D data of each measuring point detected by the sensor are stored in a first data set (3D point cloud), processed according to the method according to an embodiment of the invention and compared with at least one other data set.

Figure 1:
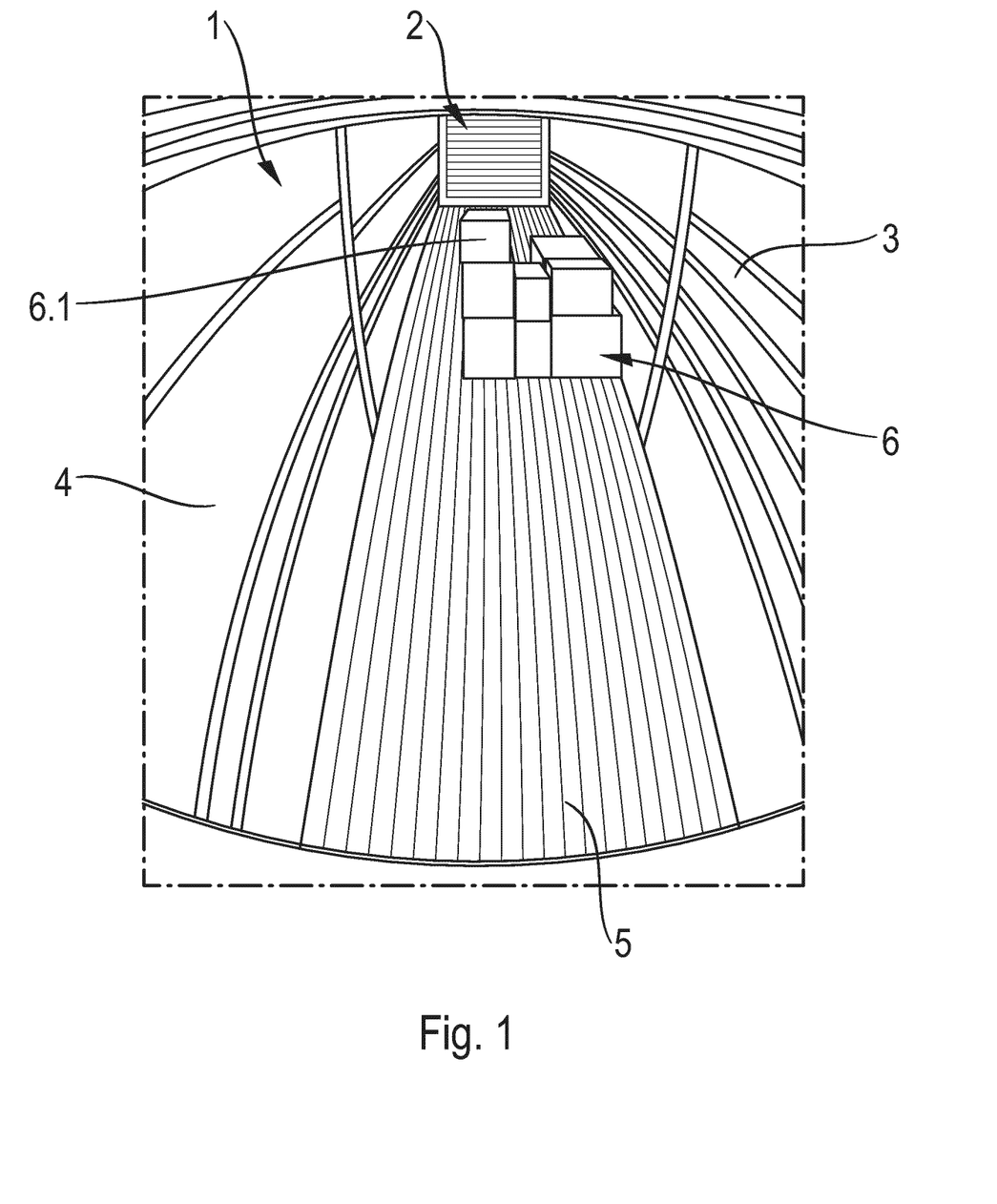
FIG. 1 shows in the form of a sketch a monitor representation of a cargo space, which is based on detected 3D data, which has been computationally processed for a representation of a three-dimensional cargo image.

FIG. 1 shows a sketch of a monitor representation in which a cargo space was measured three-dimensionally with at least one distance-measuring, depth-sensitive sensor with the help of the method according to an embodiment of the invention and the current distances of measuring points or measuring point sets of any bodies or cargo parts in the cargo space were detected by the sensor as measured values in the form of 3D data and computationally processed for the most realistic representation of the cargo condition in the form of a three-dimensional cargo image on a monitor. Such processing of the 3D data then provides the easily interpreted image according to FIG. 1 on a monitor.

A distance measuring TOF sensor is located in an upper corner of the rear tail lift of the cargo space 1. This location is particularly suitable for the arrangement of such a sensor, as the entire cargo space up to the front wall is then within the measuring range of the sensor and the measuring range is not obstructed by introduced bodies or cargo parts, as long as the cargo is always properly stowed in the depths of the cargo space.

FIG. 1 then shows a view into the interior of a cargo space 1, namely from its rear tail lift towards its front boundary wall. The right boundary wall 3, the left boundary wall 4, the loading area or floor 5 and the front boundary wall 2 can be seen. Various objects are also recognizable, namely various cargo parts 6 located on the cargo space floor 5. This is the cargo space of a truck, the loading area of which is provided with a framework of struts and battens, which is covered with a tarpaulin.

FIG. 1 shows an initial situation in which the cargo part 6.1 is in its original position, namely in the position in which it was loaded.

Figure 2:
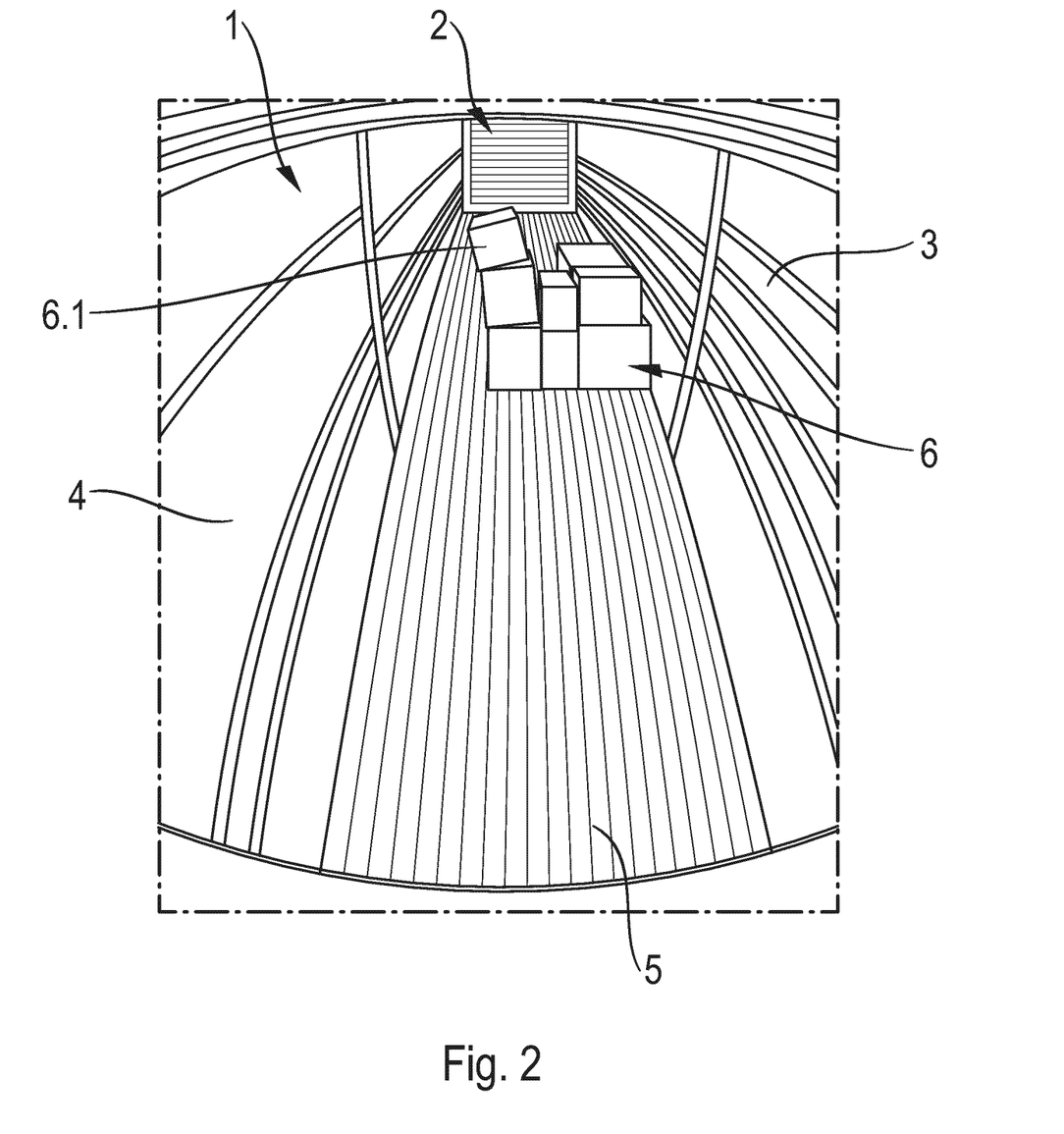
FIG. 2 shows a representation according to FIG. 1, but with a situation in which a part of the cargo is tilted and shifted from the original position thereof.

On the other hand, FIG. 2 shows a situation in which the cargo part 6.1 is tilted and shifted from its original position. Otherwise, the presentation and data processing in FIG. 2 correspond to those in FIG. 1.

Figure 3:
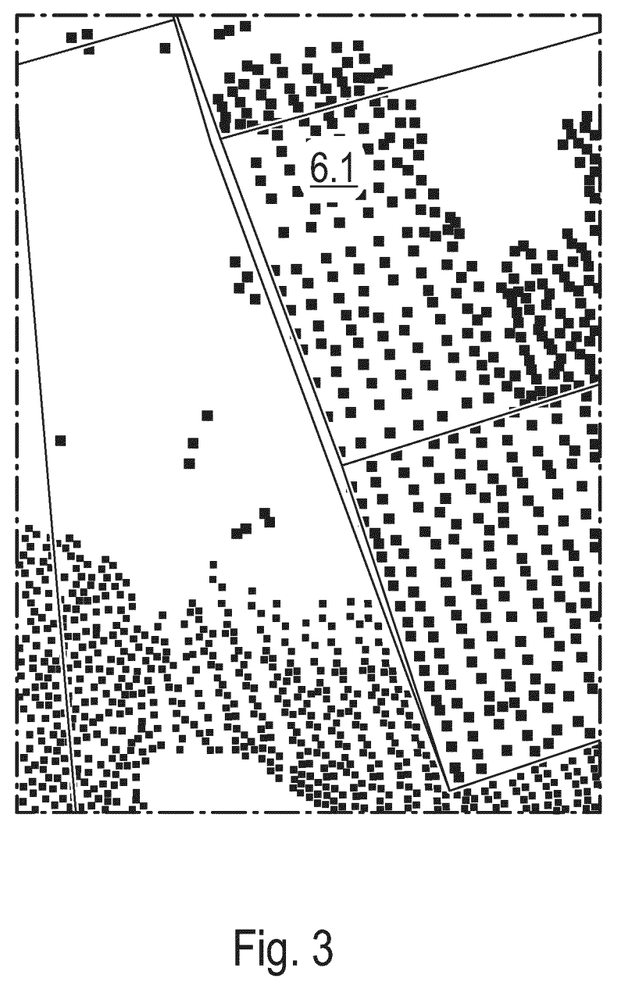
FIGS. 3 and 4 show a two-dimensional, simple monitor representation of the result of a third step of the method according to an embodiment of the invention.
Figure 4:
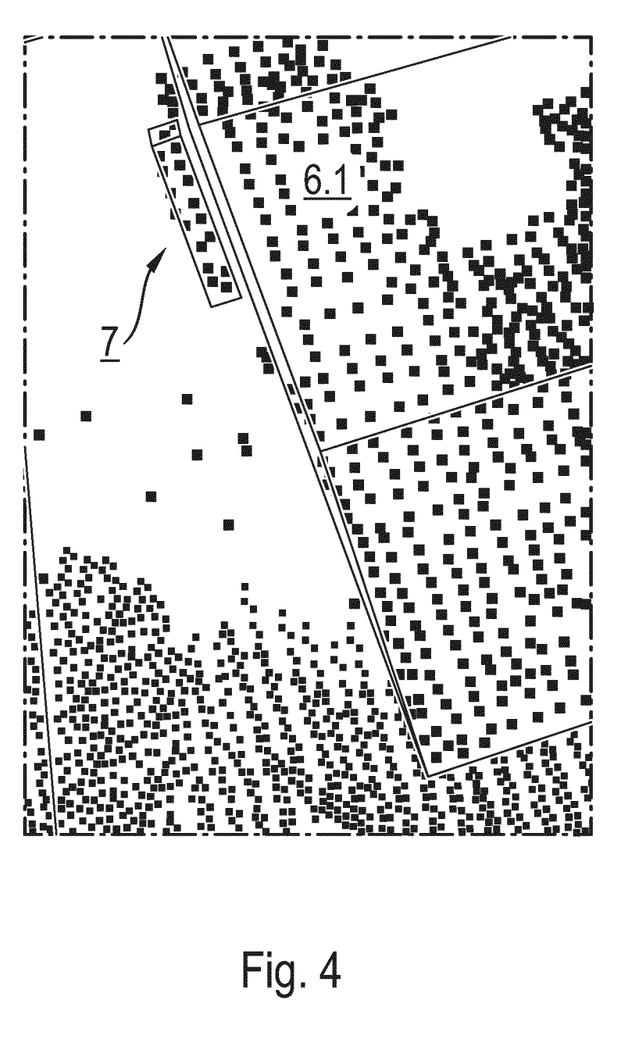

FIG. 3 now shows the result of the third step of the method according to an embodiment of the invention in a different and only two-dimensional simpler monitor representation, in which pixels, namely 2D data of the individual, spatially corresponding measuring points of the first and the further measurements, were compared with each other by means of an algorithm programmed in the computation and/or evaluation unit. FIGS. 3 and 4 show enlarged sections of the overall picture of FIGS. 1 and 2, in a left-leaning representation.

If we look at the representations of FIG. 4 in comparison with the representation in FIG. 3, we can see that in FIG. 4 a number of changes in the pixels or 2D data were detected from spatially corresponding measuring points of the first and the further data set, namely a change in individual, particularly conspicuous and prominent 2D data 7, which belong to the boundary or corner area of the cargo part 6.1.

Figure 5:
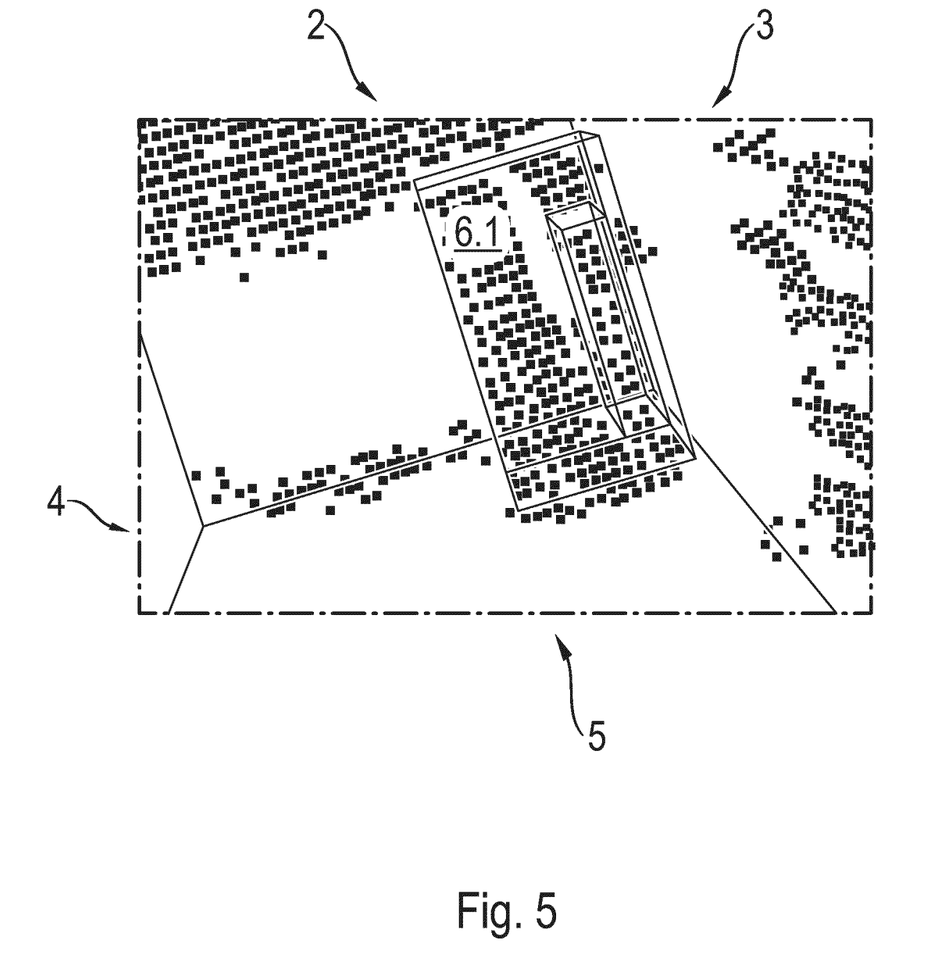
FIGS. 5 and 6 show an enlarged view of the details shown in FIGS. 3 and 4 in their overall environment.
Figure 6:
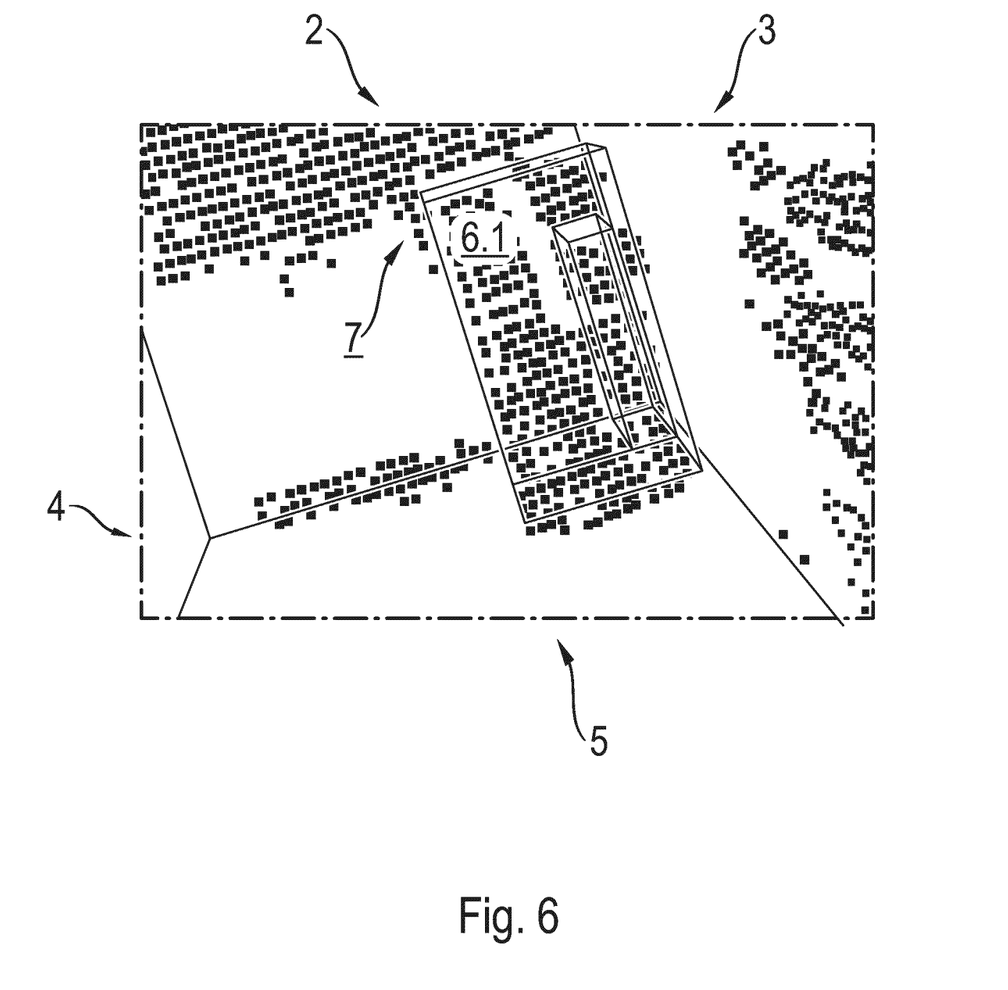

FIGS. 5 and 6 show a slightly enlarged view of the details shown in FIGS. 3 and 4 in their overall surroundings, wherein there is also a left-leaning representation of the cargo space. FIGS. 5 and 6 also include guidelines calculated from the other data obtained, which make it possible to identify the cargo space walls 2, 3, 4 and the cargo space floor 5.

Figure 7:
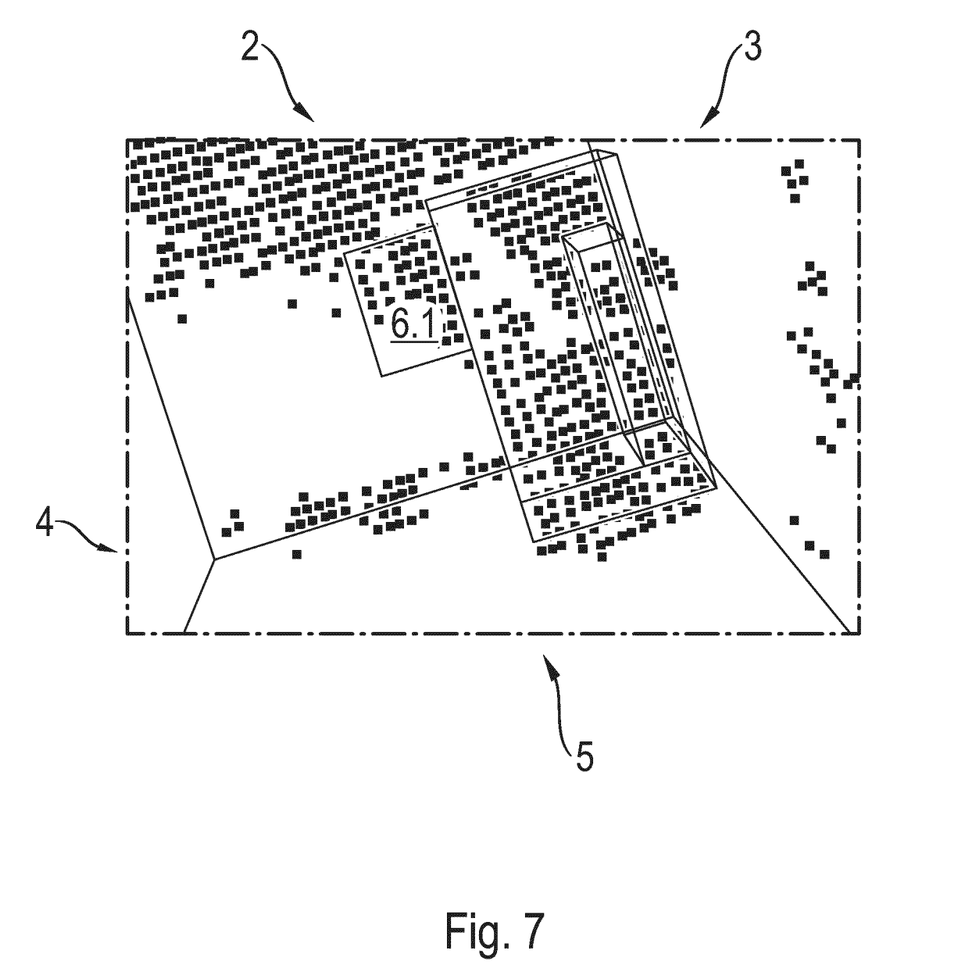
FIG. 7 shows the result of a further step of the method according to an embodiment, prepared for a monitor display, in which the first and the further data set or the further data sets (3D point cloud) are checked by means of an algorithm to determine whether subsets of the 3D data contained therein describe or characterize a three-dimensional body or a cargo part.

Finally, FIG. 7 shows the result prepared for a monitor display, after which further steps of the method are triggered. The detection of the changes in individual data then leads to the fact that the first and the further data sets (3D point cloud) are checked by means of an algorithm in the fourth step of the method to determine whether subsets of the 3D data contained therein describe or characterize a three-dimensional body or a cargo part.

This is the case here for the cargo part 6.1, so that the 3D data of the cargo part 6.1 were stored, indexed and also provided with a time stamp as a 3D data cluster (subset) characterizing this three-dimensional cargo part. In the further step according to the method, namely in the fifth step, the 3D data clusters of the successive different measurements are then compared with each other, after which spatial changes of the cargo part within a time interval were detected and a signal describing and processing these changes was provided by the computation and/or evaluation unit. In this case, the signal is a warning signal to the effect that, after an initial swaying of the cargo or the cargo part 6.1, it has finally been determined that the cargo part is falling or has fallen from its stack.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGN LIST (PART OF THE DESCRIPTION)

1 cargo space
2 front wall of the cargo space
3 right boundary wall of the cargo space
4 left boundary wall of the cargo space
5 cargo space floor
6 cargo parts, entirety of the cargo
6.1 single cargo part
7 change of individual conspicuous 3D data

The invention claimed is:

1. A method for detecting moving bodies inside a cargo space, wherein the cargo space is measured three-dimensionally with at least one distance-measuring, depth-sensitive sensor and the current distances of measuring points of any bodies in the cargo space are detected by the sensor as measured values in the form of 3D data, the method comprising:
  arranging the at least one sensor in the cargo space such that a measuring range of the at least one sensor covers the cargo space,
  in a first step, measuring the distances of the measuring points of the bodies in the cargo space with the at least one sensor and storing the 3D data describing each measuring point of the bodies in the cargo space as a first data set in a computer;
  in a second step, carrying out a further, subsequent three-dimensional measurement of the bodies in the cargo space with the at least one sensor and storing 3D data describing the corresponding measuring points of the bodies in the cargo space in the computer as a further data set;
  in a third step, comparing 3D data of the individual, spatially corresponding measuring points of the first data set and the further data set with each other by an algorithm programmed in the computer and, based on the comparison, determining distances between the compared individual, spatially corresponding measuring points of the first data set and the further data set;
  in a fourth step, identifying, by the algorithm programmed in the computer, subsets of the 3D data contained in the first and the further data set that characterize individual three-dimensional bodies and storing each subset as a 3D data cluster; and
  in a fifth step, comparing the 3D data clusters of the first and further data set with each other by the algorithm in the computer,
  wherein a signal is output by the computer that describes spatial changes of the bodies within a time interval based on the comparison of the 3D data clusters for spatially corresponding three-dimensional bodies of the first and further data set, the spatial changes comprising dynamic information about movement of the bodies in the cargo space.

2. The method as claimed in claim 1, wherein in the third step the 3D data of the first and the further measurement are compared with each other, and wherein the fourth and fifth steps are carried out based on a determination that a number of changes of the 3D data exceeds a predetermined threshold value.

3. The method as claimed in claim 2, wherein periodic measurement of the 3D data of each measuring point is carried out at a frequency of 1 to 5 Hz.

4. The method as claimed in claim 1, wherein the interior of the cargo space is periodically measured three-dimensionally.

5. The method as claimed in claim 1, wherein during the first and second steps of the three-dimensional measurement of the bodies in the cargo space, parameters thereof with regard to a position and width, height and depth thereof are stored as a 3D data cluster.

6. The method as claimed in claim 1, wherein the at least one depth-sensitive sensor comprises a 2D sensor or camera configured to obtain 2D images, wherein the 3D data comprises 2D data of each 2D image acquired by the 2D sensor or camera and distance information for each image point of the 2D image, wherein in the third step the 2D data of the individual, spatially corresponding measuring points of the first and the further measurement are compared with each other by the algorithm stored in the computer and inclusion of the distance information for each image point is based on detecting changes in the 2D data from spatially corresponding measuring points of the first and the further data set.

7. The method as claimed in claim 1, wherein the change in the 3D data compared to preceding measurements is checked for changed positioning of a body with the same or changing sign in a spatial x, y, or z direction.

8. The method as claimed in claim 1, wherein the change in the 3D data compared to preceding measurements is checked for a spatial change of a 3D data cluster characterizing an indexed three-dimensional body.

9. The method as claimed in claim 1, wherein the sensor is in the form of an optical depth sensor, in particular as a time of flight camera or stereo camera.

10. The method as claimed in claim 1, wherein the sensor is in the form of a LiDAR sensor or laser scanner.

11. The method as claimed in claim 1, wherein the sensor is arranged on a wall or boundary of the cargo space and a measuring range of the sensor covers the entire cargo space.

12. The method as claimed in claim 1, comprising:
checking a confidence and completeness of the 3D data of the further data set by comparing the spatial changes to one or more expected values, and
establishing a threshold value for noise during the measurement or classification.

13. The method as claimed in claim 1, further comprising outputting, based on the signal output by the computer, a visual representation of the cargo space, the spatial assignment of the bodies in the cargo space and a current cargo condition on a monitor in the form of a three-dimensional cargo image.

14. The method as claimed in claim 1, wherein the signal is made available for storage in data processing systems, in particular for use in control devices and for use and processing within a data communication system.

15. A device for monitoring a cargo space for carrying out the method as claimed in claim 1, the device comprising:
at least one distance-measuring, depth-sensitive sensor for repeated, three-dimensional measurement of the cargo space; and
a computer with a programmed algorithm,
wherein by the computer and the algorithm, 3D data describing each measuring point of any bodies located in the cargo space of each data set obtained by repeated measurement are compared with each other using the method and a processable signal is provided if changes are detected.

16. A vehicle with a cargo space, comprising:
at least one distance-measuring, depth-sensitive sensor provided inside the cargo space for three-dimensional measurement; and
a computer with a programmed algorithm with which the 3D data of each measuring point detected by the sensor are stored in a first data set and processed in accordance with the method as claimed in claim 1 and compared with at least one other data set.

17. The method as claimed in claim 1, wherein the first data set and the further data set are provided with a timestamp.

18. The method as claimed in claim 1, further comprising generating a warning to a driver of a vehicle based on the signal output by the computer.

19. The method as claimed in claim 1, wherein the dynamic information about movement of the bodies in the cargo space comprises a determination as to whether each of the bodies is swaying or wobbling.

20. The method as claimed in claim 19, further comprising determining that at least one body of the bodies in the cargo space is swaying or wobbling and subsequently outputting a warning signal based on a determination that the at least one body that was determined to be swaying or wobbling is falling.

* * * * *